June 9, 1931.  E. F. ALTMAN  1,808,742
CLEANING SIEVE
Filed July 23, 1928  3 Sheets-Sheet 3
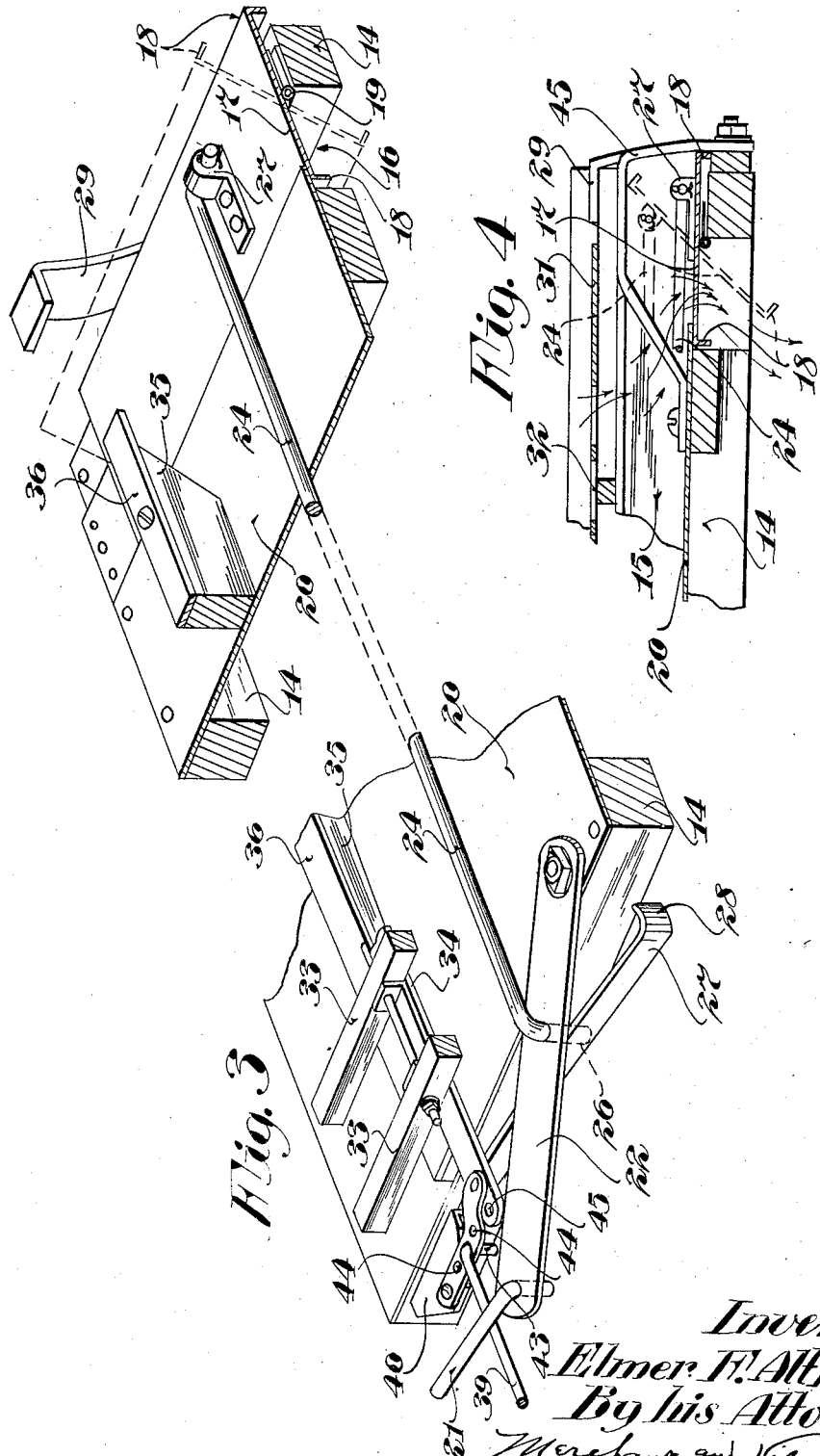
Inventor
Elmer F. Altman
By his Attorneys
Merchant and Keyes Patented June 9, 1931

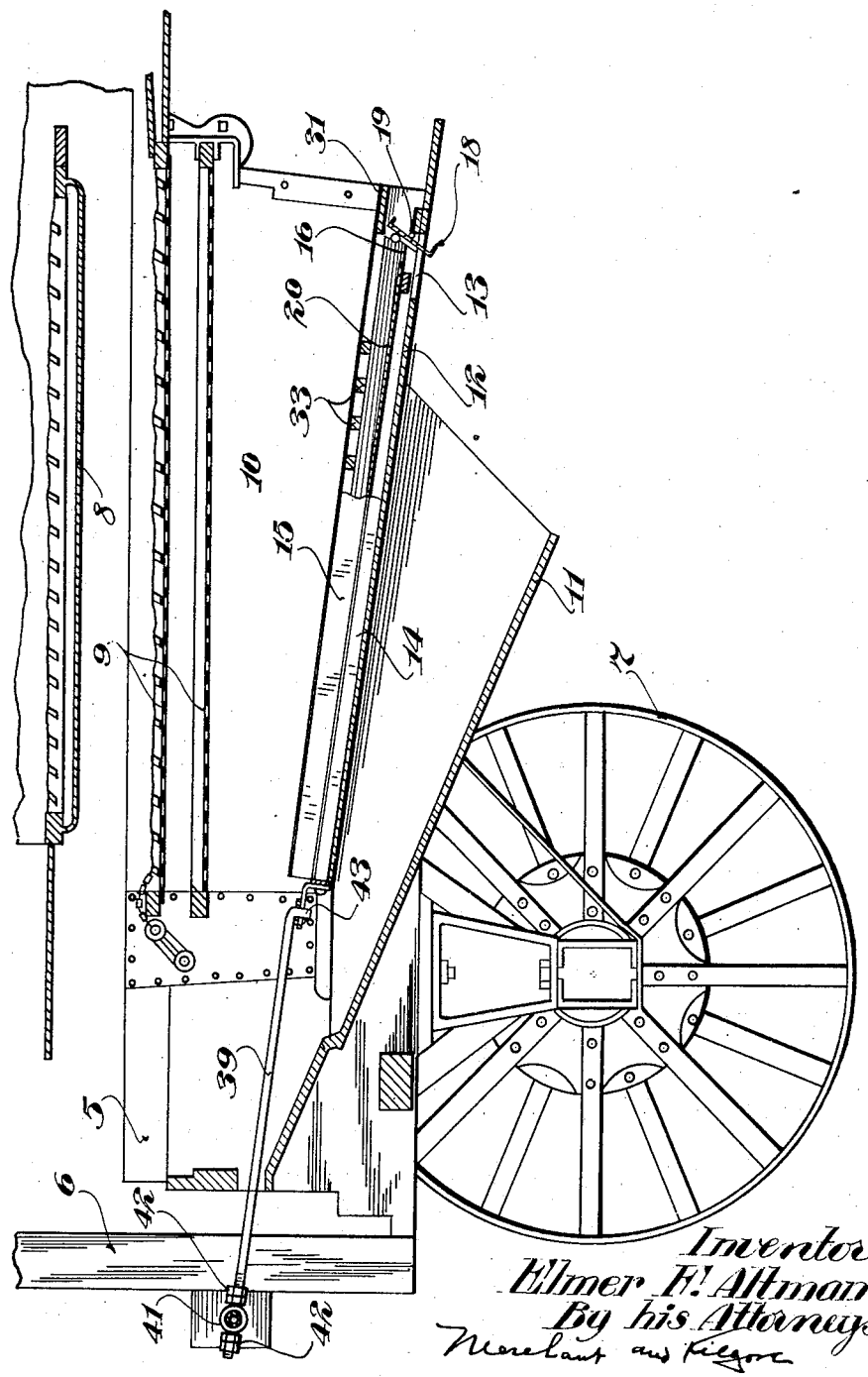

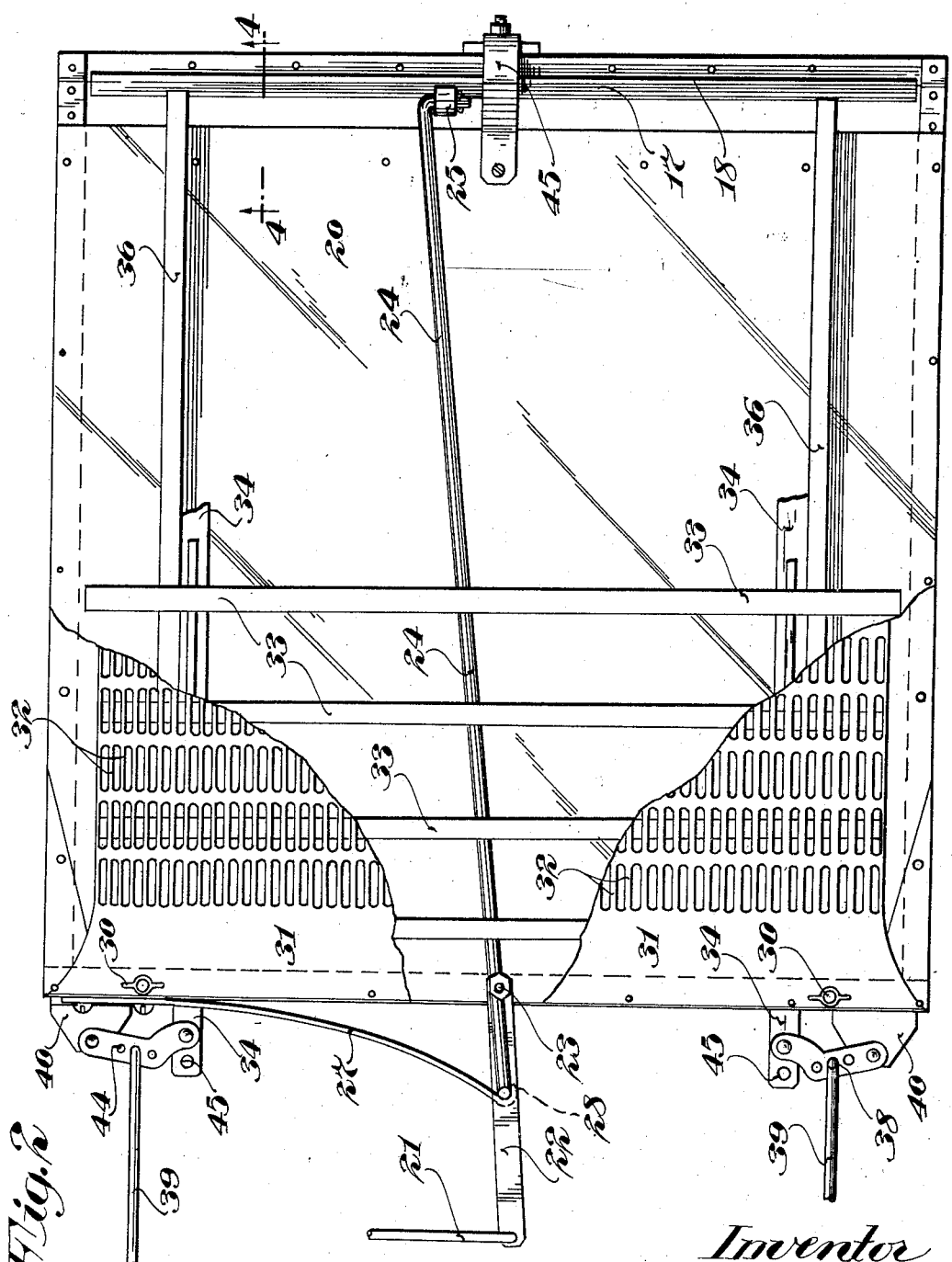

1,808,742

UNITED STATES PATENT OFFICE

ELMER F. ALTMAN, OF MINNEAPOLIS, MINNESOTA, ASSIGNOR TO THE SELF KLEEN THRESHER SCREEN CO., OF MINNEAPOLIS, MINNESOTA, A CORPORATION OF MINNESOTA

CLEANING SIEVE

Application filed July 23, 1928. Serial No. 294,716.

My invention relates to a recleaning sieve, especially adapted for use in connection with threshing machines for separating dockage from good grain such as good wheat or good oats or a mixture of the two, usually termed "succotash." Dockage may include various different seeds such as pigeon grass, buckwheat, barley, pin oats, mustard, cracked or shrivelled wheat and the like.

This recleaning sieve when applied to a threshing machine will be arranged to receive the commingled grains that have passed through the chaffer or scalper sieves and from which the straw, chaff and all objects larger than wheat and oats will have been removed.

My invention has for its object to provide an extremely simple and highly efficient recleaning sieve structure that is free from obstructions that would tend to cause the dockage having passed through the recleaning sieve to pile up and clog or obstruct the free passage of said dockage over a gate-equipped deck from which the dockage may be either permanently separated from the good grain passing over the recleaning sieve or again commingled therewith. This piling up of the commingled grains is more liable to take place when the same is damp.

Said invention further provides simple and efficient means for imparting a vibratory movement to a cleaning device for the recleaning sieve when used in connection with a threshing machine commonly known as a short-stroke machine.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view principally in central vertical section showing a threshing machine of standard or well known construction having the invention embodied therein;

Fig. 2 is a plan view of the improved recleaning sieve removed from the threshing machine, some parts being broken away;

Fig. 3 is a fragmentary perspective view of the recleaning sieve with some parts removed and other parts shown in different positions by means of broken lines; and Fig. 4 is a fragmentary detail view principally in section taken on the line 4—4 of Fig. 2, on an enlarged scale with the gate shown in a closed position by means of full lines and an open position by means of broken lines.

Of the parts of the threshing machine shown in Fig. 1, it is important to note the housing 5, frame 6, rear supporting wheels 7, vibratory grain pan 8, chaffer 9, vibratory sieve shoe 10 and inclined bottom deck 11. The vibratory sieve shoe 10 is provided with the customary inclined bottom or deck 12 having near its lower end portion a large transverse discharge passage 13.

Referring now in detail to the improved recleaning sieve, which, as illustrated and as preferably designed, is constructed as a complete self-contained structure adapted for ready application to the inclined bottom 12 of the sieve shoe 10 of the threshing machine of standard construction. In new threshing machine structures the improved recleaning sieve may be incorporated with the vibratory shoe 10 as an entirety and without requiring the shoe bottom or deck 12.

The improved recleaning sieve structure, as illustrated, includes a separating sieve or surface proper, a cleaning device, a bottom deck, a gate in the bottom deck, and a two-part or sectional frame, the sections of which are detachably connected. The separating sieve or surface is carried by the upper section of the two-part frame and is interchangeable with other sieves of the same character but having perforations or passages of different sizes or character for affecting different kinds of separators. The frame sections are both rectangular structures and are indicated, respectively, by numerals 14 and 15.

The lower frame section 12 and its discharge end has longitudinally spaced transverse members that afford a large transverse discharge passage 16 that overlies the passage 13 and a gate 17 is provided for opening and closing this passage at will. As shown, the gate 17 is formed from a sheet metal plate, the front and rear edges of which are turned laterally downward to afford reinforcing flanges 18. Hinges 19 connect the gate 17 to the front transverse member of the frame section 14.

It will be noted that the members of the hinges 19 on the gate 17 are on the under side thereof and that the pivotal connections between the members of said hinges are between the front and rear edges of the gate 17 so that when the gate is turned to substantially vertical position, as shown by full lines in Fig. 1 and broken lines in Figs. 3 and 4, its major portion extends downward through the passage 16 and its minor portion extends upward quite a distance above the frame 14. The purpose of thus mounting the gate 17 will presently appear.

An imperforate plate or deck 20 preferably of thin sheet metal closes the top of the frame section 14 and its lower edge portion extends slightly into the passage 16, as best shown in Figs. 3 and 4. It is important to note that the top of the gate 17 is flat and when said gate is closed, it extends parallel to the deck 20 with its upper edge portion overlapped by the lower edge portion of the deck 20, and forms a smooth unobstructed extension thereof with a tight joint between the deck and gate.

The gate 17 is preferably operated from one side of the threshing machine by a transverse hand-manipulated rod 21, the outer end portion of which extends to one side of said machine and the inner end thereof is pivotally connected to the free end of a rearwardly projecting lever 22, the front end of which is fulcrumed at 23 to the rear bar of the frame member 14. This lever 22 is connected to the gate 17 by a longitudinally extended rod 24, the rear end of which is pivoted to said lever intermediate of its ends and its front end is pivotally connected to a lug 27 on the top of the gate 17.

By reference to Fig. 3 it will be noted that the operating rod 24 is pivotally connected to the lever 22 by having its respective end bent laterally downward to form a pivot stud 26 which extends through a hole in said lever and below the same for a purpose that will presently appear.

For yieldingly holding the gate 17, both in its extreme closed and open positions, according to the position in which it may be set, a curved leaf spring 27 is rigidly anchored at one of its ends to the outer face of the rear transverse bar of the frame 14, extends longitudinally thereof and bears on the pivot stud 26, see Fig. 3.

When the gate 17 is closed the lever 22 extends obliquely to the rod 24 and the spring 27 bears at its longitudinal center on the pivot stud 26, as shown by full lines in Fig. 3, and tends to move the rod 24 in a direction to yieldingly hold the gate 17 closed. The lever 22, when the gate 17 is open, as shown by dotted lines in Figs. 3 and 4, is substantially aligned with the rod 24 and the spring 27 as its outer end bears on the stud 26 and tends to move the rod 24 in a direction to close the gate 17 but this movement is prevented by the lever 22, which by its alignment with the rod 24 holds said rod against such movement. The free end portion of the spring 27 is bent laterally to form a stop 28 arranged to be engaged by the pivot stud 26 when the gate 17 is closed to limit the movement of the lever 22 into substantial alignment with the rod 24 and prevent said lever from moving beyond a dead center and out of contact with the spring 27. The spring 27 by its curved contact with the pivot stud 26 yieldingly holds the pivot stud 26 against the stop 28 and also yielding holds the lever 22 against movement tending to close the gate 17.

The upper frame section 15 is detachably secured to the lower frame section 14 by a pair of hook-acting brackets 29, and a pair of thumb-nut-equipped bolts 30. Said brackets 29 are anchored to the front transverse bar of the frame section 14 and their upper ends are bent laterally rearward and engage metal wearing plates 31 on the upper face of the front transverse bar of the frame section 15. The bolts 30 are passed through bolt holes in the rear transverse bars of the frame section 14 and 15.

Secured to the upper frame section 15 and stretched over the top thereof is a sieve surface preferably in the form of a zinc plate 31 having elongated perforations 32. The actual construction of this plate is best shown in Fig. 2. By reference to Fig. 1 it will be noted that the side rails of the lower frame section 14 are strips having parallel upper and lower edges while the side rails of the upper frame section 15 are strips that have increasing depth from their rear to their front ends so that the space between the deck 20 and sieve plate 31 increases in the direction from the rear to the front of the sieve structure and gives increased clearance for the swinging movement of the upper portion of the gate 17 when the latter is turned into an open position, as indicated by dotted lines in Fig. 4.

It will be noted that the upper portion of the gate 17, when said gate is in an open position, practically closes the passage between the upper and lower frame section 14 and 15, respectively, and positively stops the flow of seed or grain in a forward direction and deflects the same downward through the passage 16.

For cleaning the sieve plate 30 or, in other words, in keeping its perforations clear of grain or seed lodged therein, there is provided a sieve-cleaning device comprising transverse wooden slats 33 secured to parallel longitudinal thrust bars 34 which, as shown, are in the form of straight flat iron strips. The slats 33 rest on parallel laterally spaced rails 35 secured to the top of the deck 20 and are preferably provided with metal facing strips 36. The rails 35 are of increasing depth from their rear to their front ends, and their upper surfaces to which facing strips 36 are applied are parallel to the sieve plate 31 so that the cleaning device, when moved longitudinally or when in action will maintain constant contact with the under side of said sieve plate.

By reference to Fig. 2 it will be noted that the thrust bars 34 work close to the rail facing strips 36 and co-operate therewith to guide the sieve-cleaning device and to hold the same against lateral movements.

As the sieve frame 14—15 is mounted on the shoe 10, vibratory movement is imparted thereto longitudinally of the threshing machine and a relative movement of the cleaning device in respect to the sieve plate 31 is best produced by connecting the sieve frame 14—15 to the thrust bars 34 by short motion reversing levers 38 intermediately fulcrumed to the front ends of the forwardly projecting rods 39. These levers 38 extend transversely of the direction of the vibratory movement of the sieve plate 31 and have one of their ends pivoted to the rear end portions of the thrust bars 34 and their other ends are pivotally attached to rearwardly projecting plates 40 on the rear transverse bar of the frame section 14. The rear end portions of the rods 39 project through holes in an anchor pipe 41 on the frame 6 and which rods are rigidly secured against endwise movement by pairs of opposing nuts 42. Said rods 39, however, are free for slight angular movements to permit their front end portions to be moved toward or from each other for a purpose that will presently appear.

The rods 39 are secured to the levers 38 by having their front end portions bent laterally downwardly to form hooks 43 adapted to be inserted through any one of a plurality of longitudinally spaced holes 44 in said levers when the rods 39 are in the intermediate holes 44 the vibratory movements of the sieve plate 31 and cleaning device will be the same but when in either of the outer holes 44 differential vibratory movements will be imparted to the cleaning device.

Obviously, the vibratory movement of the sieve frame 14—15 imparted thereto by the vibratory shoe 10 will operate the levers 38 and impart a vibratory movement to the cleaning device that is reverse from that imparted to the sieve plate 31 by said shoe. A bridge bracket 45 affording a rest for the intermediate portion of the front bar of the frame section 15, spans the passage 16 and is rigidly secured to said frame section.

The operating connections for vibrating the cleaning device in a reverse direction relative to the vibratory movement of the sieve plate 31 are especially well adapted for use in connection with short stroke machines wherein the vibratory movement of the shoe 10 is insufficient to cause a stationary cleaning device for the sieve plate to keep the perforations therein open.

In so-called long stroke machines wherein the vibratory movement of the shoe 10 is such as to cause the sieve plate 31 to move sufficient in respect to a stationary cleaning device to keep its perforations open, said cleaning device is held stationary by removing the rods 39 from the levers 38 and inserting the same through holes 45 in the thrust bars 34.

The operation of the invention may be briefly described as follows: During the threshing action the chaff and the like will be carried by the chaffer 9 and delivered to the bottom deck 11 and the commingled grain and seeds, assumed to be chiefly wheat but with various other seeds generally known as dockage, will pass through the sieves 9 and onto the sieve plate 31. The good grain and oats will be carried over said sieve plate 31 and precipitated from the lower end thereof while the dockage will pass through the perforations 32 and be precipitated onto the deck 20.

To positively separate the dockage from the good grain, the gate 17 is turned into an open position, indicated by full lines in Figs. 1 and 2 and broken lines in Fig. 3, to intercept said dockage and direct the same downward through the passages 16 and 13. The separation of the good oats from the good wheat may be accomplished by any well known machine.

By placing the spring 27 which holds the gate 17 either open or closed, outside of the sieve frame 14—15 and making the top of the gate 17 flat and mounting the same so that its flat upper surface is substantially flush with the deck 20 when closed, the passage between the deck 20 and sieve plate 31 is free from obstructions that would tend to interrupt or interfere with the free movement of the dockage on the deck 20 to the open gate 17 over the same when closed. The reverse relative vibratory movement imparted to the cleaning device in respect to the vibrating sieve plate 31, keeps the passages 32 in the sieve plate 31 open and free from obstructions that would tend to interfere with the free passage of the dockage therethrough.

It is, of course, understood that sieve plates 31 having different sizes of mesh or openings may be employed and the one can be quickly substituted for the other by removing the frame section 15 from the frame section 14.

What I claim is:

1. A device of the class described comprising a sieve, a deck underlying the sieve and having a discharge passage near its delivery end, a gate hinged in respect to the deck and arranged to open and close the discharge passage, said gate when open projecting above the deck and affording a stop plate for directing the materials through the discharge passage, operating connections for the gate including a lever fulcrumed on the frame of the device rearward of the receiving end of the sieve and a longitudinally extended rod, the front end of which is attached to the gate and the other end of which is attached to the lever intermediate of its ends, and a spring on said frame rearward of the receiving end of the sieve and under strain to move the rod forward to close the gate, said lever when the gate is open being arranged to hold the rod against the action of the spring.

2. A device of the class described comprising a sieve, a deck underlying the sieve and having a discharge passage near its delivery end, a gate hinged in respect to the deck and arranged to open and close the discharge passage, said gate when open projecting above the deck and affording a stop plate for directing the materials through the discharge passage, operating connections for the gate including a lever fulcrumed on the frame of the device rearward of the receiving end of the sieve and a longitudinally extended rod, the front end of which is attached to the gate and the rear end of which is attached to the lever intermediate of its ends, and a leaf spring, one end of which is anchored the device on said frame rearward of the receiving end of the sieve and the other end of which is provided with a stop surface, said spring bearing on a lateral projection on the rod and under strain to move the rod forward to close the gate, said lever when the gate is open being arranged to hold the rod against the action of the spring which tends to close the gate, said spring and its stop surface being operative on the lateral projection on the rod when the gate is open to hold the lever against movement in either direction.

3. A device of the class described comprising a sieve, a deck underlying the sieve and having a discharge passage near its delivery end, a gate hinged in respect to the deck and arranged to open and close the discharge passage, said gate when open projecting above the deck and affording a stop plate for directing the materials through the discharge passage, operating connections for the gate including a lever fulcrumed on the frame of the device rearward of the receiving end of the sieve and a longitudinally extended rod, the front end of which is attached to the gate and the other end of which has a pivot connecting the rod to the lever intermediate of its ends, and a spring bearing on the pivot and held thereby under tension tending to operate the rod and close the gate.

4. The structure defined in claim 2 in which the lever is movable to one side of a dead center to close the gate and to the other side thereof to open the same, said spring being operative to hold the lever on either side of a dead center.

In testimony whereof I affix my signature.

ELMER F. ALTMAN.